US011485855B2

(12) United States Patent
Seidel

(10) Patent No.: US 11,485,855 B2
(45) Date of Patent: Nov. 1, 2022

(54) COMPOSITION AND THERMOPLASTIC MOULDING COMPOUND FOR PRODUCTION OF MOULDED ARTICLES HAVING ELEVATED GLOSS

(71) Applicant: Covestro Intellectual Property GmbH & Co. KG, Leverkusen (DE)

(72) Inventor: Andreas Seidel, Dormagen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 8 days.

(21) Appl. No.: 17/041,076

(22) PCT Filed: Mar. 26, 2019

(86) PCT No.: PCT/EP2019/057584
§ 371 (c)(1),
(2) Date: Sep. 24, 2020

(87) PCT Pub. No.: WO2019/185627
PCT Pub. Date: Oct. 3, 2019

(65) Prior Publication Data
US 2021/0095119 A1 Apr. 1, 2021

(30) Foreign Application Priority Data
Mar. 28, 2018 (EP) ..................... 18164467

(51) Int. Cl.
*C08L 69/00* (2006.01)
*C08L 55/02* (2006.01)
*C08L 51/04* (2006.01)

(52) U.S. Cl.
CPC ............. *C08L 69/005* (2013.01); *C08L 55/02* (2013.01); *C08L 69/00* (2013.01); *C08L 2205/025* (2013.01)

(58) Field of Classification Search
None
See application file for complete search history.

(56) References Cited

U.S. PATENT DOCUMENTS

| 2,991,273 | A | 7/1961 | Peilstocker et al. |
| 2,999,825 | A | 9/1961 | Floyd et al. |
| 2,999,846 | A | 9/1961 | Heinrich et al. |
| 3,028,635 | A | 4/1962 | Herubel |
| 3,148,172 | A | 9/1964 | Fox et al. |
| 3,271,367 | A | 9/1966 | Heinrich et al. |
| 4,885,335 | A | 12/1989 | Gallucci et al. |
| 4,982,014 | A | 1/1991 | Casser et al. |
| 5,097,002 | A | 3/1992 | Sakashita et al. |
| 5,340,905 | A | 8/1994 | Alewelt et al. |
| 5,717,057 | A | 2/1998 | Nagai et al. |
| 2007/0135568 | A1* | 6/2007 | Eckel ................... C08L 69/005 525/63 |
| 2009/0239991 | A1 | 9/2009 | Avtomonov et al. |
| 2013/0267635 | A1* | 10/2013 | Seidel ................... C08L 51/04 524/117 |
| 2016/0319128 | A1 | 11/2016 | Woo et al. |

FOREIGN PATENT DOCUMENTS

| CN | 102365328 A | 2/2012 |
| CN | 106084710 A | 11/2016 |
| DE | 2035390 A1 | 1/1971 |
| DE | 2036052 A1 | 1/1972 |
| DE | 2063050 A | 7/1972 |
| DE | 3832396 A1 | 2/1990 |
| EP | 2657258 A1 | 10/2013 |
| GB | 1122003 A | 7/1968 |
| GB | 1229482 A | 4/1971 |
| GB | 1367790 A | 9/1974 |
| GB | 1409275 A | 10/1975 |
| WO | 0105867 A1 | 1/2001 |
| WO | 200105866 A1 | 1/2001 |
| WO | 200162851 A1 | 8/2001 |
| WO | 200170884 A1 | 9/2001 |
| WO | 2004063249 A1 | 7/2004 |
| WO | 2007009622 A1 | 1/2007 |
| WO | 2007065577 A1 | 6/2007 |
| WO | 2014086743 A1 | 6/2014 |

OTHER PUBLICATIONS

Acrylonitrile-Butadiene-Styrene Polymers in The Encyclopedia of Polymer Science and Technology vol. 1 (2001) pp. 174-203. (Year: 2001).*
D. Freitag, U. Grigo, P.R. Muller, H. Nouverté, Bayer AG, "Polycarbonates" in Encyclopedia of Polymer Science and Engineering, vol. 11, Second Edition, 1988, pp. 648-718.
Ullmann's, Enzyklopädie der Technischen Chemie [Ullmann's Encyclopedia of Industrial Chemistry], vol. 19 (1980), p. 280 ff.
W. Scholtan, H. Lange. Kolloid-Z. und Z. Polymere 250 (1972). 782-796).
International Search Report, PCT/EP2019/057584, dated Jul. 2, 2019, Authorized officer: Maciej Madalinski.
Versalis, Brochure "Acrylonitrile Butadiene Styrene Copolymers Continuous Mass Polymerization Technology", Versalis Spa, San Donato Milanese, Italy.
Trinseo, Presentation material "Abs for Medical Applications", Jul. 11, 2018.

* cited by examiner

Primary Examiner — David J Buttner
(74) Attorney, Agent, or Firm — John E. Mrozinski, Jr.; Richard P. Bender

(57) ABSTRACT

The present invention relates to a composition, preferably a polycarbonate composition, for production of a thermoplastic moulding compound,
comprising or consisting of polycarbonate and/or polyestercarbonate, two different rubber-modified vinyl copolymers in a weight ratio of 20:80 to 90:10,
wherein both rubber-modified vinyl copolymers contain vinyl copolymer incorporated in the rubber particles as a separate disperse phase,
and wherein one of the vinyl copolymers contains at least one alkyl (meth)acrylate,
and to the moulding compound itself, to the use of the composition or moulding compound for production of moulded articles, and to the moulded articles themselves.

13 Claims, No Drawings

COMPOSITION AND THERMOPLASTIC MOULDING COMPOUND FOR PRODUCTION OF MOULDED ARTICLES HAVING ELEVATED GLOSS

CROSS-REFERENCE TO RELATED APPLICATION

This application is a national stage application under 35 U.S.C. § 371 of PCT/EP2019/057584, filed Mar. 26, 2019, which claims the benefit of European Application No. 18164467.5, filed Mar. 28, 2018, each of which is incorporated herein by reference.

FIELD

The present invention relates to a composition, preferably a polycarbonate composition, for production of a thermoplastic moulding compound, to the moulding compound itself, to the use of the composition or moulding compound for production of moulded articles, and to the moulded articles themselves.

BACKGROUND

Compositions for production of thermoplastic moulding compounds, especially also polycarbonate compositions, have long been known. The compositions and moulding compounds produced therefrom are used to produce moulded articles for a multitude of applications, for example for the automotive sector, for the construction sector and for the electronics sector.

The properties of the moulded articles produced from such thermoplastic moulding compounds can be adjusted to the demands of the respective use via the selection of the components of the compositions and the ranges of amounts in which these components are used in the compositions.

To increase toughness, especially at low temperatures, blending partners having elastomeric properties are added to the polycarbonate as impact modifiers. The impact modifiers in turn may differ in the chemical composition of the elastic component or else the morphology thereof. In addition, impurities introduced in the production process for the impact modifiers can affect the polycarbonate and hence the properties of the polycarbonate compositions and the moulding compounds and moulded articles produced therefrom.

Acrylonitrile-butadiene-styrene (ABS) copolymers are used on a large scale as blending partners having elastomeric properties for polycarbonate compositions. As well as the improvement in toughness at low temperatures and further mechanical properties, for instance elongation at break in a tensile test, ABS in most cases also facilitates the melt flowability of the thermoplastic moulding compounds produced from the polycarbonate compositions and hence facilitates processing to give moulded articles.

In many applications, the moulded articles produced are under tension and simultaneously in contact with chemicals. Under these conditions, there can be failure of the moulded articles by stress cracking. Stress cracking resistance is therefore a further property that is to be improved through the use of the elastomeric component.

Acrylonitrile-butadiene-styrene (ABS) copolymers can be produced via free-radical polymerization. A commonly used method is the bulk polymerization method, which leads to a product having high purity and favourable rheological properties. The high purity of such ABS polymers produced by a bulk polymerization method enables compositions comprising polycarbonate that are suitable for production of PC+ABS moulding compounds that have good stability to particular ageing effects, especially improved stability under warm and moist conditions to which the moulded articles produced from the moulding compounds can be exposed in use.

WO 2007/009622 A1 discloses, for example, polycarbonate bulk ABS compositions with a low lithium content that are notable for improved hydrolysis stability.

It is also known that modifications of the ABS component can further improve the mechanical and rheological properties of polycarbonate ABS moulding compounds and hence match them to particular demands.

WO 01/62851 A1 discloses PC+bulk ABS compositions having improved processability and improved impact resistance in an injection-moulded component comprising bulk ABS comprising a star-branched rubber having three or more arms.

WO 01/70884 A1 discloses PC+bulk ABS compositions having reduced anisotropic toughness characteristics comprising bulk ABS with a matrix phase comprising a copolymer of an aromatic monovinylidene monomer, an ethylenically unsaturated nitrile monomer and an ester of acrylic acid, in which the content of the ester of acrylic acid is in the range of 0.1% to 15% by weight of the copolymer.

As well as the variation in the one ABS component used, it is also possible in polymer blend systems to achieve further optimizations with regard to specific profiles of properties via mixtures of two or more such blending partners.

WO 2007/065577 A1 discloses PC+ABS moulding compounds based on mixtures of two different bulk ABS polymers containing free (co)polymer of different molecular weight, which have an improved balance of toughness even at low temperatures and melt flowability and additionally have good ageing resistance under the influence of moist and warm conditions, good processing stability and good chemical stability.

DETAILED DESCRIPTION

Through the use of ABS produced by the bulk polymerization method (bulk ABS), it is thus possible to obtain PC+ABS compositions that have a finely balanced profile of properties with the abovementioned advantages. However, this method generally produces, if anything, ABS polymers containing comparatively coarse rubber-containing graft particles that can adversely affect the surface impression of the moulded articles produced from such PC+bulk ABS compositions of PC+bulk ABS moulding compounds. More particularly, the gloss of the moulded articles produced from such PC+bulk ABS compositions or PC+bulk ABS moulding compounds is inadequate for many applications.

It was therefore desirable to provide a composition for production of a thermoplastic PC+bulk ABS moulding compound which can be used to produce moulded articles having elevated surface gloss. Preferably, the composition should additionally feature a good balance of high flowability and processing stability of the moulding compound produced therefrom and good (notched impact) toughness, especially also at low temperatures, and stress cracking resistance under the influence of chemicals in the moulded articles produced from the moulding compounds produced from the composition. Further preferably, the moulding compound produced from the composition and the moulded articles produced therefrom should have good ageing resistance on exposure to moist and warm conditions.

More preferably, elongation at break is also to be improved.

It has now been found that, surprisingly, the desired properties are possessed by a composition for production of a thermoplastic moulding compound
wherein the composition comprises or consists of the constituents which follow and
wherein the weight ratio of components B and C in the composition is in the range from 20:80 to 90:10, preferably in the range from 40:60 to 85:15, more preferably in the range from 60:40 to 80:20,
A) at least one polymer selected from the group consisting of aromatic polycarbonate and aromatic polyestercarbonate,
B) rubber-modified vinyl copolymer formed from
  B.1) 80% to 95% by weight, based on the rubber-modified vinyl copolymer B, of structural units derived from
    B.1.1) 60% to 90% by weight, based on component B.1, of styrene
    B.1.2) 10% to 40% by weight, based on component B.1, of acrylonitrile
  B.2) 5% to 20% by weight, based on the rubber-modified vinyl copolymer B, of one or more elastomeric graft bases having glass transition temperatures <−50° C., containing at least 50% by weight, based on B.2, of structural units derived from 1,3-butadiene,
  wherein the rubber-modified vinyl copolymer B comprises
    (i) a disperse phase consisting of
      (i.1) rubber particles grafted with vinyl copolymer composed of structural units B.1 and
      (i.2) vinyl copolymer incorporated in the rubber particles as a separate disperse phase, likewise composed of structural units B.1, and
    and
    (ii) a rubber-free vinyl copolymer matrix not bound to the rubber particles and not incorporated into these rubber particles, consisting of structural units B.1,
C) rubber-modified vinyl copolymer formed from
  C.1) 80% to 95% by weight, based on the rubber-modified vinyl copolymer C, of structural units derived from
    C.1.1) 60% to 85% by weight, based on component C.1, of styrene
    C.1.2) 10% to 35% by weight, based on component C.1, of acrylonitrile
    C.1.3) 0.5% to 15% by weight, based on component C.1, of at least one alkyl (meth)acrylate,
  C.2) 5% to 20% by weight, based on the rubber-modified vinyl copolymer C, of one or more elastomeric graft bases having glass transition temperatures <−50° C., containing at least 50% by weight, based on C.2, of structural units derived from 1,3-butadiene,
  wherein the rubber-modified vinyl copolymer C comprises
    (iii) a disperse phase consisting of
      (iii.1) rubber particles grafted with vinyl copolymer composed of structural units C.1 and
      (iii.2) vinyl copolymer incorporated in the rubber particles as a separate disperse phase, likewise composed of structural units C.1,
    and
    (iv) a rubber-free vinyl copolymer matrix not bound to the rubber particles and not incorporated into these rubber particles, consisting of structural units C.1, Preferably, the composition contains 30% to 90% by weight, further preferably 40% to 80% by weight, more preferably 55% to 75% by weight, of component A.

Preferably, the composition contains 5% to 50% by weight, preferably 10% to 40% by weight, more preferably 15% to 35% by weight, of component B.

Preferably, the composition contains 3% to 40% by weight, preferably 5% to 30% by weight, more preferably 6% to 15% by weight, of component C.

Preferably, the composition contains 0% to 20% by weight, preferably 0.1% to 10% by weight, further preferably 0.2% to 5% by weight, of polymer additives as further component D.

Preferably, the composition comprises or consists of
30% to 90% by weight, further preferably 40% to 80% by weight, more preferably 55% to 75% by weight, of component A,
5% to 50% by weight, preferably 10% to 40% by weight, more preferably 15% to 35% by weight, of component B,
3% to 40% by weight, preferably 5% to 30% by weight, more preferably 6% to 15% by weight, of component C,
0% to 20% by weight, preferably 0.1% to 10% by weight, further preferably 0.2% to 5% by weight, of polymer additives as further component D.

Preferably, the composition consists to an extent of at least 90% by weight of components A to D. More preferably, the composition consists solely of components A to D.

Further preferably, the composition contains 1.5% to 7.5% by weight, preferably 2.0% to 6.0% by weight, more preferably 2.5% to 4.5% by weight, of structural units derived from 1,3-butadiene.

Component A

Component A is a thermoplastic or a mixture of different thermoplastics selected from at least one polymer from the group consisting of polycarbonate and polyestercarbonate.

Preferably, component A is selected from at least one polymer from the group consisting of aromatic polycarbonate and aromatic polyestercarbonate, and in a most preferred embodiment component A) is aromatic polycarbonate or a mixture of different aromatic polycarbonates.

"Polycarbonate" is understood in accordance with the invention to mean both homopolycarbonates and copolycarbonates. These polycarbonates may be linear or branched in the familiar manner. According to the invention, mixtures of polycarbonates may also be used.

A portion, up to 80 mol %, preferably from 20 mol % up to 50 mol %, of the carbonate groups in the polycarbonates used in accordance with the invention may have been replaced by preferably aromatic dicarboxylic ester groups. Polycarbonates of this kind that incorporate both acid radicals from the carbonic acid and acid radicals from preferably aromatic dicarboxylic acids into the molecular chain are referred to as aromatic polyestercarbonates.

The carbonate groups are replaced essentially stoichiometrically and also quantitatively by the aromatic dicarboxylic ester groups, and so the molar ratio of the coreactants is also reflected in the finished polyestercarbonate. The aromatic dicarboxylic ester groups can be incorporated either randomly or in blocks.

The thermoplastic polycarbonates including the thermoplastic polyestercarbonates have average molecular weights Mw determined by GPC (gel permeation chromatography in methylene chloride with a polycarbonate standard) of 15 kg/mol to 50 kg/mol, preferably of 20 kg/mol to 35 kg/mol, more preferably of 23 kg/mol to 33 kg/mol.

The preferred aromatic polycarbonates and/or aromatic polyestercarbonates are prepared in a known manner from diphenols, carbonic acid or carbonic acid derivatives and, in the case of the polyestercarbonates, preferably aromatic dicarboxylic acids or dicarboxylic acid derivatives, optionally chain terminators and branching agents.

Details of the production of polycarbonates have been set out in many patent specifications during the last approximately 40 years. Reference may be made here by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouverné, BAYER AG, "Polycarbonates" in Encyclopedia of Polymer Science and Engineering, Volume 11, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Aromatic polycarbonates and polyestercarbonates are prepared, for example, by reacting diphenols with carbonyl halides, preferably phosgene, and/or with aromatic dicarbonyl halides, preferably benzenedicarbonyl halides, by the interfacial process, optionally with use of chain terminators and optionally with use of trifunctional or more than trifunctional branching agents, with preparation of the polyestercarbonates by replacing a portion of the carbonic acid derivatives with aromatic dicarboxylic acids or derivatives of the dicarboxylic acids, and with aromatic dicarboxylic ester structural units according to the carbonate structural units to be replaced in the aromatic polycarbonates. Another possibility is preparation by way of a melt polymerization process via reaction of diphenols with diphenyl carbonate, for example.

Dihydroxyaryl compounds suitable for producing polycarbonates are those of formula (1)

(1)

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

Preferably, Z in formula (1) is a radical of the formula (2)

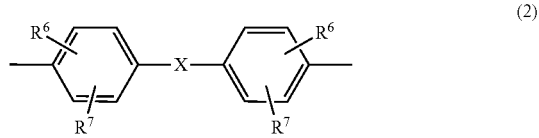

(2)

in which $R^6$ and $R^7$ are independently H, $C_1$- to $C_{18}$-alkyl-, $C_1$-to $C_{18}$-alkoxy, halogen such as Cl or Br or in each case optionally substituted aryl or aralkyl, preferably H or $C_1$- to $C_{12}$-alkyl, more preferably H or $C_1$- to $C_8$-alkyl and most preferably H or methyl, and X is a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, and also $C_6$- to $C_{12}$-arylene which may optionally be fused to aromatic rings containing further heteroatoms.

Preferably, X is a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of the formula (2a)

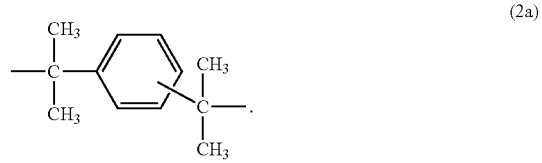

(2a)

Examples of diphenols suitable for the preparation of polycarbonates include hydroquinone, resorcinol, dihydroxydiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes, phthalimidines derived from derivatives of isatin or phenolphthalein and the ring-alkylated, ring-arylated and ring-halogenated compounds thereof.

Preferred diphenols are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

Greatest preference is given to 2,2-bis(4-hydroxyphenyl) propane (bisphenol A).

These and further suitable diphenols are described, for example, in U.S. Pat. Nos. 3,028,635, 2,999,825, 3,148,172, 2,991,273, 3,271,367, 4,982,014 and 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

Only one diphenol is used in the case of the homopolycarbonates, and two or more diphenols in the case of the copolycarbonates. The diphenols used, like all the other chemicals and auxiliaries added to the synthesis, may be contaminated with the impurities originating from their own synthesis, handling and storage. However, it is desirable to use raw materials of the highest possible purity.

Examples of suitable carbonic acid derivatives include phosgene or diphenyl carbonate.

Suitable chain terminators that may be used in the preparation of the polycarbonates are monophenols. Examples of suitable monophenols include phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or tert-butyl-substituted.

Particularly preferred chain terminators are phenol, cumylphenol and/or p-tert-butylphenol.

The amount of chain terminator to be used is preferably 0.1 to 5 mol %, based on moles of diphenols used in each case. The chain terminators can be added before, during or after the reaction with a carbonic acid derivative.

Suitable branching agents are the trifunctional or more than trifunctional compounds known in polycarbonate chemistry, in particular those having three or more than three phenolic OH groups.

Examples of suitable branching agents include 1,3,5-tri (4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2, 4-dihydroxyphenyl)propane, tetra(4-hydroxyphenyl) methane, tetra(4-(4-hydroxyphenylisopropyl)phenoxy) methane and 1,4-bis((4',4''-dihydroxytriphenyl)methyl) benzene and 3,3-bis(3-methyl-4-hydroxyphenyl)-2-oxo-2,3-dihydroindole.

The amount of the branching agents for optional use is preferably from 0.05 mol % to 2.00 mol % based on moles of diphenols used in each case.

The branching agents can either be initially charged with the diphenols and the chain terminators in the aqueous alkaline phase or added dissolved in an organic solvent before the phosgenation. In the case of the transesterification process, the branching agents are used together with the diphenols.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Preferred modes of preparation of the polycarbonates for use in accordance with the invention, including the polyestercarbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

Most preferably used as component A is aromatic polycarbonate based on bisphenol A.

Component B

Component B comprises rubber-modified vinyl copolymers formed from

B.1) 80% to 95% by weight, preferably 85% to 93% by weight, further preferably 88% to 92% by weight, based on the rubber-modified vinyl copolymer B, of structural units derived from
 B.1.1) 60% to 90% by weight, preferably 65% to 85% by weight, more preferably 70% to 80% by weight, based on component B.1, of styrene,
 B.1.2) 10% to 40% by weight, preferably 15% to 35% by weight, more preferably 20% to 30% by weight, based on component B.1, of acrylonitrile, and
B.2) 5% to 20% by weight, preferably 7% to 15% by weight, further preferably 8% to 12% by weight, based on the rubber-modified vinyl copolymer B, of one or more elastomeric graft bases having glass transition temperatures $T_g$<−50° C., preferably of <−60° C., more preferably <−70° C., comprising at least 50% by weight, preferably at least 75% by weight, more preferably 100% by weight, based on B.2, of structural units derived from 1,3-butadiene, wherein the rubber-modified vinyl copolymer B comprises
 (i) a disperse phase consisting of
  (i.1) rubber particles grafted with vinyl copolymer composed of structural units B.1 and
  (i.2) vinyl copolymer incorporated in the rubber particles as a separate disperse phase, likewise composed of structural units B.1, and and
 (ii) a rubber-free vinyl copolymer matrix not bound to the rubber particles and not incorporated into these rubber particles, consisting of structural units B.1.

The disperse phase (i) preferably has a median diameter D50 measured by ultracentrifugation of 0.3 to 2.0 μm, further preferably of 0.5 to 1.5 μm, especially of 0.7 to 1.2 μm.

Unless expressly stated otherwise in the present invention, the glass transition temperature $T_g$ is determined for all components by dynamic differential scanning calorimetry (DSC) to DIN EN 61006 (1994 version) at a heating rate of 10 K/min with determination of $T_g$ as the midpoint temperature (tangent method).

The rubber-modified vinyl copolymers of component B have a melt volume flow rate (MFR), measured to ISO 1133 (2012 version) at 220° C. with a ram load of 10 kg, of preferably 2 to 20 g/10 min, more preferably 3 to 15 g/10 min and especially 4 to 8 g/10 min. If mixtures of multiple rubber-modified vinyl copolymers are used as component B, the preferred MFR ranges apply to the average of the MFR of the individual components in component B weighted by the proportions by mass of the components in the mixture.

Such rubber-modified vinyl copolymers B are prepared by polymerization, preferably by the bulk polymerization method, of B.1 and B.2 in the proportions by weight stated above.

The bulk polymerization method employed with preference for production of the rubber-modified graft copolymer B comprises both the polymerization of the vinyl monomers B.1 and grafting of the vinyl copolymer thus formed onto the rubber-elastic graft base B.2. In addition, in this reaction regime, self-organization (phase separation) forms a disperse phase (i) consisting of
 (i.1) rubber particles grafted with vinyl copolymer composed of structural units B.1 and
 (i.2) vinyl copolymer incorporated in the rubber particles as a separate disperse phase, likewise composed of structural units B.1,
where this rubber-containing disperse phase (i) is dispersed in a rubber-free vinyl copolymer matrix (ii) not bound to the rubber particles and not incorporated into these rubber particles, consisting of structural units B.1.

The rubber-free vinyl copolymer (ii), by contrast with the other vinyl copolymer fractions in component B, can be leached out by means of suitable solvents, for example acetone.

The size of the disperse phase (i) in the rubber-modified vinyl copolymers B thus prepared is adjusted via the conditions of the reaction regime, such as the temperature and resulting viscosity of the polymer and shear as a result of stirring, for example.

The median particle size D50 is the diameter with 50% by weight of the particles above it and 50% by weight below it. Unless expressly stated otherwise in the present invention, it is determined for all components by means of ultracentrifuge measurement (W. Scholtan, H. Lange, Kolloid-Z. and Z. Polymere 250 (1972), 782-796).

Preferred graft bases B.2 are diene rubbers containing butadiene, or mixtures of diene rubbers containing butadiene or copolymers of diene rubbers containing butadiene or mixtures thereof with further copolymerizable monomers (for example according to B.1).

A particularly preferred graft base B.2 is pure polybutadiene rubber. In a further preferred embodiment, B.2 is styrene-butadiene block copolymer rubber.

Component B preferably has a polybutadiene content of 5% to 18% by weight, further preferably of 7% to 14% by weight, especially of 8% to 12% by weight.

Particularly preferred rubber-modified vinyl copolymers of component B are bulk ABS polymers as described, for example, in DE-A 2 035 390 (=U.S. Pat. No. 3,644,574) or in DE-A 2 248 242 (=GB-A 1 409 275), or in Ullmann's, Enzyklopädie der Technischen Chemie [Ullmann's Encyclopedia of Industrial Chemistry], Vol. 19 (1980), p. 280 ff.

The vinyl copolymer (ii) not chemically bonded to the rubber base(s) B.2 and not incorporated in the rubber particles may, as explained above, arise as a result of the preparation in the polymerization of the graft polymers B. It is likewise possible that a portion of this vinyl copolymer (ii) of the rubber-modified vinyl copolymer component B not chemically bonded to the rubber base(s) B.2 and not incorporated in the rubber particles arises as a result of the preparation in the preparation thereof and another portion is polymerized separately and added to component B as a constituent of component B. The proportion x(ii) of the vinyl (co)polymer (ii), irrespective of its origin, measured as the acetone-soluble fraction, in component B, based on component B, is preferably at least 60% by weight, more preferably at least 70% by weight, further preferably at least 75% by weight. The proportion x(ii) of the vinyl copolymer (ii), irrespective of its origin, measured as the acetone-soluble fraction, in component B, based on component B, is preferably not more than 95% by weight, more preferably not more than 90% by weight, further preferably not more than 85% by weight.

This vinyl copolymer (ii) in the rubber-modified vinyl copolymers of component B preferably has a weight-average molecular weight $M_w(ii)$ of 140 to 200 kg/mol, further preferably 150 to 180 kg/mol.

In the context of the present invention, the weight average molecular weight $M_w(ii)$ of the vinyl copolymer in component B is measured by gel permeation chromatography (GPC) in tetrahydrofuran against polystyrene as standard.

Component B is preferably free of alkali metal, alkaline earth metal, ammonium or phosphonium salts of saturated fatty acids having 8 to 22 carbon atoms, resin acids, alkyl- and alkylarylsulfonic acids and fatty alcohol sulfates.

Component B preferably contains less than 100 ppm, more preferably less than 50 ppm, most preferably less than 20 ppm, of ions of alkali metals and alkaline earth metals.

Component C

Component C comprises rubber-modified vinyl copolymers formed from

C.1) 80% to 95% by weight, preferably 85% to 93% by weight, further preferably 88% to 92% by weight, based on the rubber-modified vinyl copolymer C, of structural units derived from C.1.1) 60% to 85% by weight, preferably 65% to 80% by weight, more preferably 67% to 75% by weight, based on component C.1, of styrene, C.1.2) 10% to 35% by weight, preferably 15% to 30% by weight, more preferably 20% to 28% by weight, based on component C.1, of acrylonitrile, C.1.3) 0.5% to 15% by weight, preferably 2% to 8% by weight, more preferably 3% to 6% by weight, based on component C.1, of at least one alkyl (meth) acrylate, and C.2) 5% to 20% by weight, preferably 7% to 15% by weight, further preferably 8% to 12% by weight, based on the rubber-modified vinyl copolymer C, of one or more elastomeric graft bases having glass transition temperatures $T_g$ <−50° C., preferably of <−60° C., more preferably <−70° C., comprising at least 50% by weight, preferably at least 75% by weight, more preferably 100% by weight, based on C.2, of structural units derived from 1,3-butadiene, wherein the rubber-modified vinyl copolymer C comprises (iii) a disperse phase consisting of (iii.1) rubber particles grafted with vinyl copolymer composed of structural units C.1 and (iii.2) vinyl copolymer incorporated in the rubber particles as a separate disperse phase, likewise composed of structural units C.1, and and (iv) a rubber-free vinyl copolymer matrix not bound to the rubber particles and not incorporated into these rubber particles, consisting of structural units C.1.

The disperse phase (iii) preferably has a median diameter D50 measured by ultracentrifugation of 0.3 to 2.0 μm, further preferably of 0.4 to 1.5 μm, especially of 0.4 to 0.7 μm.

The rubber-modified vinyl copolymers of component C have a melt volume flow rate (MFR), measured to ISO 1133 (2012 version) at 220° C. with a ram load of 10 kg, of preferably 2 to 60 g/10 min, more preferably 10 to 50 g/10 min and especially 20 to 40 g/10 min. If mixtures of multiple rubber-modified vinyl copolymers are used as component C, the preferred MFR ranges apply to the average of the MFR of the individual components weighted by the proportions by mass of the components in the mixture.

Such rubber-modified vinyl copolymers C are prepared by polymerization, preferably by the bulk polymerization method, of C.1 and C.2 in the proportions by weight stated above.

The bulk polymerization method employed with preference for production of the rubber-modified graft copolymer C comprises both the polymerization of the vinyl monomers C.1 and grafting of the vinyl copolymer thus formed onto the rubber-elastic graft base C.2. In addition, in this reaction regime, self-organization (phase separation) forms a disperse phase (iii) consisting of (iii.1) rubber particles grafted with vinyl copolymer composed of structural units C.1 and (iii.2) vinyl copolymer incorporated in the rubber particles as a separate disperse phase, likewise composed of structural units C.1, where this rubber-containing disperse phase (iii) is dispersed in a rubber-free vinyl copolymer matrix (iv) not bound to the rubber particles and not incorporated into these rubber particles, consisting of structural units C.1.

The rubber-free vinyl copolymer (iv), by contrast with the other vinyl copolymer fractions in component C, can be leached out by means of suitable solvents, for example acetone.

The size of the disperse phase (iv) in the rubber-modified vinyl copolymers C thus prepared is adjusted via the conditions of the reaction regime, such as the temperature and resulting viscosity of the polymer and shear as a result of stirring, for example.

The median particle size D50 is the diameter with 50% by weight of the particles above it and 50% by weight below it. Unless expressly stated otherwise in the present invention, it is determined for all components by means of ultracentrifuge measurement (W. Scholtan, H. Lange, Kolloid-Z. and Z. Polymere 250 (1972), 782-796).

Monomer C.1.3 is an alkyl (meth)acrylate, preferably a (C1-C8)-alkyl (meth)acrylate.

Further-preferred monomers C.1.3 are methyl methacrylate, ethyl methacrylate, n-butyl acrylate and tert-butyl acrylate. Most preferably, C.1.3 is n-butyl acrylate.

Preferred graft bases C.2 are diene rubbers containing butadiene, or mixtures of diene rubbers containing butadiene or copolymers of diene rubbers containing butadiene or mixtures thereof with further copolymerizable monomers (for example according to C.1).

A particularly preferred graft base C.2 is pure polybutadiene rubber. In a further preferred embodiment, C.2 is styrene-butadiene block copolymer rubber.

Component C preferably has a polybutadiene content of 5% to 18% by weight, further preferably of 7% to 14% by weight, especially of 8% to 12% by weight.

Particularly preferred rubber-modified vinyl copolymers of component B can be prepared analogously to the disclosures of DE-A 2 035 390 (=U.S. Pat. No. 3,644,574) or of DE-A 2 248 242 (=GB-A 1 409 275), or in Ullmann's, Enzyklopädie der Technischen Chemie [Ullmann's Encyclopedia of Industrial Chemistry], Vol. 19 (1980), p. 280 ff.

The vinyl copolymer (iv) not chemically bonded to the rubber base(s) C.2 and not incorporated in the rubber particles may, as explained above, arise as a result of the preparation in the polymerization of the graft polymers C. It is likewise possible that a portion of this vinyl copolymer (iv) of the rubber-modified vinyl copolymer of component C not chemically bonded to the rubber base(s) C.2 and not incorporated in the rubber particles arises as a result of the preparation in the preparation thereof and another portion is polymerized separately and added to component C as a constituent of component C. The proportion x(iv) of the vinyl copolymer (iv), irrespective of its origin, measured as the acetone-soluble fraction, in component C, based on component C, is preferably at least 60% by weight, more preferably at least 70% by weight, further preferably at least 75% by weight. The proportion x(iv) of the vinyl (co) polymer (iv), irrespective of its origin, measured as the acetone-soluble fraction, in component C, based on component C, is preferably not more than 95% by weight, more preferably not more than 90% by weight, further preferably not more than 85% by weight.

This vinyl copolymer (iv) in the rubber-modified vinyl copolymers of component C preferably has a weight-average molecular weight $M_w(iv)$ of 110 to 130 kg/mol.

In the context of the present invention, the weight average molecular weight $M_w(iv)$ of the vinyl copolymer (iv) in component C is measured by gel permeation chromatography (GPC) in tetrahydrofuran against polystyrene as standard.

Component C is preferably free of alkali metal, alkaline earth metal, ammonium or phosphonium salts of saturated fatty acids having 8 to 22 carbon atoms, resin acids, alkyl- and alkylarylsulfonic acids and fatty alcohol sulfates.

Component C preferably contains less than 100 ppm, more preferably less than 50 ppm, most preferably less than 20 ppm, of ions of alkali metals and alkaline earth metals.

Components B and C each contain a vinyl polymer matrix having the above-specified molecular weights Mw(ii) and Mw(iv). This results in an averaged molecular weight gMw which is calculated by the following equation:

$$gMw = [x(ii) \cdot Mw(ii) \cdot x(B) + x(iv) \cdot Mw(iv) \cdot x(C)] / [x(ii) \cdot x(B) + x(iv) \cdot x(C)]$$

where

Mw(ii) is the average molecular weight Mw, measured by means of gel permeation chromatography in tetrahydrofuran against polystyrene as standard, of the vinyl copolymer matrix (ii) in component B, x(B) is the proportion of component B in % by weight in the composition, Mw(iv) is the average molecular weight Mw, measured by means of gel permeation chromatography in tetrahydrofuran against polystyrene as standard, of the vinyl copolymer matrix (iv) in component C and x(C) is the proportion of component C in % by weight in the composition.

Preferably, the averaged molecular weight gMw is in the range from 125 to 160 kg/mol, further preferably in the range of 135 to 155 kg/mol, more preferably in the range from 140 to 150 kg/mol.

The disperse phase (i) in component B and the disperse phase (iii) in component C preferably have the abovementioned median particle diameters D50. Further preferably, at least one of the two disperse phases (i) and (iii) has a median diameter D50 measured by ultracentrifugation of 0.7 to 1.5 μm.

Component D

As component D the composition according to the invention may comprise one or more polymer additives preferably selected from the group consisting of flame retardants, anti-drip agents, flame retardant synergists, smoke inhibitors, lubricants and demoulding agents, nucleating agents, antistats, conductivity additives, stabilizers (e.g. hydrolysis, heat aging and UV stabilizers and also transesterification inhibitors), flow promoters, phase compatibilizers, further impact modifiers other than components B and C (either with or without a core-shell structure, e.g. methyl methacrylate-butadiene-styrene copolymers with core-shell structure (MBS) prepared by emulsion polymerization), further polymeric constituents other than components A, B and C (for example functional blend partners), fillers and reinforcers, and dyes and pigments.

In a preferred embodiment, the composition does not contain any fillers and reinforcers.

In a preferred embodiment, the composition contains at least one polymer additive selected from the group consisting of lubricants and demoulding agents, stabilizers, flow promoters, phase compatibilizers, further impact modifiers, further polymeric constituents, dyes and pigments.

In a preferred embodiment, the composition contains pentaerythritol tetrastearate as a demoulding agent.

In a preferred embodiment, the composition contains, as stabilizer, at least one representative selected from the group consisting of sterically hindered phenols, organic phosphites and sulfur-based co-stabilizers.

In a particularly preferred embodiment, the composition contains, as stabilizer, at least one representative selected from the group consisting of octadecyl 3-(3,5-di-tert-butyl-4-hydroxyphenyl)propionate and tris(2,4-di-tert-butylphenyl) phosphite.

In a particularly preferred embodiment, the composition contains, as component D, at least one representative selected from the group consisting of lubricants and demoulding agents, stabilizers, flow promoters and dyes and pigments and is free from other polymer additives of component D.

In a further-preferred embodiment the composition contains, as component D, at least one demoulding agent, at least one stabilizer and optionally at least one dye and/or one pigment and is free of further polymer additives of component D.

If the composition contains, as component D or as a constituent of component D, a graft polymer prepared by emulsion polymerization, this is used in a proportion by weight that preferably does not exceed 15% of the sum total of the proportions by weight of components B and C, further preferably 10% of the sum total of the proportions by weight of components B and C, more preferably 7% by weight of the sum total of the proportions by weight of components B and C.

Further preferably, the composition contains, as component D, graft polymer prepared by emulsion polymerization in an amount of not more than 6% by weight, preferably not more than 4% by weight, further preferably not more than 2% by weight. In the most preferred embodiment, the composition is free of any graft polymers and other polymers prepared by emulsion polymerization.

Production of the Moulding Compounds and Moulded Articles

The compositions according to the invention can be used to produce thermoplastic moulding compounds. The thermoplastic moulding compounds according to the invention can be produced, for example, by mixing the respective constituents of the compositions and melt-compounding and melt-extruding them at temperatures of preferably 200° C. to 320° C., more preferably at 240° C. to 310° C., most preferably at 260° C. to 300° C., in customary equipment such as internal kneaders, extruders and twin-shaft screw systems, in known fashion. In the context of this application, this process is generally referred to as compounding.

The term moulding compound is thus understood to mean the product obtained when the constituents of the composition are melt-compounded and melt-extruded.

The individual constituents of the compositions can be mixed in known fashion, either successively or simultaneously, either at about 20° C. (room temperature) or at a higher temperature. This means that for example some of the constituents may be added via the main intake of an extruder and the remaining constituents may be applied subsequently in the compounding process via an ancillary extruder.

The moulding compounds according to the invention can be used to produce moulded articles of any kind. These may be produced by injection moulding, extrusion and blow-moulding processes for example. A further form of processing is the production of mouldings by thermoforming from previously produced sheets or films. The moulding compounds according to the invention are particularly suitable for processing by extrusion, blow-moulding and thermoforming methods.

The constituents of the compositions may also be metered directly into an injection moulding machine or into an extrusion unit and processed to mouldings.

Examples of such mouldings that can be produced from the compositions and moulding compounds according to the invention are films, profiles, housing parts of any type, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automotive sector. The compositions and moulding compounds according to the invention are also suitable for production of the following mouldings or moulded articles: internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, moulded parts for sanitation and bath equipment, protective grilles for ventilation openings and housings for garden equipment.

Further embodiments 1 to 41 of the present invention are described hereinbelow:

1. Composition for producing a thermoplastic moulding compound, wherein the composition contains or consists of the following constituents:

A) at least one polymer selected from the group consisting of polycarbonate and polyestercarbonate, B) rubber-modified vinyl copolymer formed from B.1) 80% to 95% by weight, based on the rubber-modified vinyl copolymer B, of structural units derived from B.1.1) 60% to 90% by weight, based on component B.1, of styrene B.1.2) 10% to 40% by weight, based on component B.1, of acrylonitrile B.2) 5% to 20% by weight, based on the rubber-modified vinyl copolymer B, of one or more elastomeric graft bases having glass transition temperatures <−50° C., containing at least 50% by weight, based on B.2, of structural units derived from 1,3-butadiene, wherein the rubber-modified vinyl copolymer B comprises (i) a disperse phase consisting of (i.1) rubber particles grafted with vinyl copolymer composed of structural units B.1 and (i.2) vinyl copolymer incorporated in the rubber particles as a separate disperse phase, likewise composed of structural units B.1, and and (ii) a rubber-free vinyl copolymer matrix not bound to the rubber particles and not incorporated into these rubber particles, consisting of structural units B.1, C) rubber-modified vinyl copolymer formed from C.1) 80% to 95% by weight, based on the rubber-modified vinyl copolymer C, of structural units derived from C.1.1) 60% to 85% by weight, based on component C.1, of styrene C.1.2) 10% to 35% by weight, based on component C.1, of acrylonitrile C.1.3) 0.5% to 15% by weight, based on component C.1, of at least one alkyl (meth)acrylate, C.2) 5% to 20% by weight, based on the rubber-modified vinyl copolymer C, of one or more elastomeric graft bases having glass transition temperatures <−50° C., containing at least 50% by weight, based on C.2, of structural units derived from 1,3-butadiene, wherein the rubber-modified vinyl copolymer C comprises
(iii) a disperse phase consisting of
(iii.1) rubber particles grafted with vinyl copolymer composed of structural units C.1 and
(iii.2) vinyl copolymer incorporated in the rubber particles as a separate disperse phase, likewise composed of structural units C.1, and and
(iv) a rubber-free vinyl copolymer matrix not bound to the rubber particles and not incorporated into these rubber particles, consisting of structural units C.1,
wherein the weight ratio of components B and C is in the range from 20:80 to 90:10.

2. Composition according to Embodiment 1, wherein component A is selected from the group consisting of aromatic polycarbonate and aromatic polyestercarbonate.

3. Composition according to Embodiment 2, wherein aromatic polycarbonate based on bisphenol A is used as component A.

4. Composition according to any of the preceding embodiments, wherein component A has an average molecular weight Mw determined by gel permeation chromatography in methylene chloride with polycarbonate as standard of 23 000 g/mol to 33 000 g/mol.

5. Composition according to any of the preceding embodiments, wherein component B contains the rubber-free vinyl copolymer matrix (ii) not bound to the rubber particles and not incorporated into these rubber particles, consisting of structural units B.1, in a proportion x(ii) of 60% to 95% by weight, based on B, and
component C contains the rubber-free vinyl copolymer matrix (iv) not bound to the particles and not incorporated into these rubber particles, consisting of structural units C.1, in a proportion x(iv) of 60% to 95% by weight, based on C.

6. Composition according to Embodiment 5, wherein the average molecular weight gMw $$gMw=[x(ii){\cdot}Mw(ii){\cdot}x(B)+x(iv){\cdot}Mw(iv){\cdot}x(C)]/[x(ii){\cdot}x(B)+x(iv)x(C)]$$

is in the range from 125 to 160 kg/mol,
where:
Mw(ii) is the average molecular weight Mw, measured by means of gel permeation chromatography in tetrahydrofuran against polystyrene as standard, of the vinyl copolymer matrix (ii) in component B,
x(B) is the proportion of component B in % by weight in the composition,
Mw(iv) is the average molecular weight Mw, measured by means of gel permeation chromatography in tetrahydrofuran against polystyrene as standard, of the vinyl copolymer matrix (iv) in component C and
x(C) is the proportion of component C in % by weight in the composition.

7. Composition according to Embodiment 6, wherein gMw is in the range from 135 to 155 kg/mol.

8. Composition according to Embodiment 6, wherein gMw is in the range from 140 to 150 kg/mol.

9. Composition according to any of the preceding embodiments, wherein the vinyl copolymer matrix (ii) has an average molecular weight Mw measured by means of gel permeation chromatography in tetrahydrofuran against polystyrene as standard of 140 to 200 kg/mol.

10. Composition according to any of the preceding embodiments, wherein the vinyl copolymer matrix (ii) has an average molecular weight Mw measured by means of gel permeation chromatography in tetrahydrofuran against polystyrene as standard of 150 to 180 kg/mol.

11. Composition according to any of the preceding embodiments, wherein the vinyl copolymer matrix (iv) has an average molecular weight Mw measured by means of gel permeation chromatography in tetrahydrofuran against polystyrene as standard of 110 to 130 kg/mol.

12. Composition according to any of the preceding embodiments, wherein component C.1.3 is selected from the group consisting of methyl methacrylate, ethyl methacrylate, n-butyl acrylate and tert-butyl acrylate.

13. Composition according to any of the preceding embodiments, wherein component C.1.3 is n-butyl acrylate.

14. Composition according to any of the preceding embodiments, wherein
C.1.1) in an amount of 65% to 80% by weight, based on component C.1,
C.1.2) in an amount of 15% to 30% by weight, based on component C.1,
C.1.3) in an amount of 2% to 8% by weight, based on component C.1, are present.

15. Composition according to any of the preceding embodiments, wherein
C.1.1) in an amount of 67% to 75% by weight, based on component C.1,
C.1.2) in an amount of 20% to 28% by weight, based on component C.1,
C.1.3) in an amount of 3% to 6% by weight, based on component C.1, are present.

16. Composition according to any of the preceding embodiments, comprising 55-75% by weight of component A.

17. Composition according to any of the preceding embodiments, comprising 15-35% by weight of component B.

18. Composition according to any of the preceding embodiments, comprising 6-15% by weight of component C 19. Compositions according to any of the preceding Embodiments 1 to 15, comprising
30-90% by weight of component A,
5-50% by weight of component B,
3-40% by weight of component C,
0-20% by weight of polymer additives as further component D.

20. Compositions according to any of the preceding Embodiments 1 to 15, comprising
40-80% by weight of component A,
10-40% by weight of component B,
5-30% by weight of component C,
0.1-10% by weight of polymer additives as further component D.

21. Composition according to any of the preceding embodiments, comprising
0.2-5% by weight of component D.

22. Composition according to any of the preceding embodiments, comprising
55-75% by weight of component A,
15-35% by weight of component B,
6-15% by weight of component C,
0.2-5% by weight of polymer additives as further component D.

23. Composition according to any of the preceding embodiments, comprising 1.5% to 7.5% by weight of structural units derived from 1,3-butadiene.

24. Composition according to any of the preceding embodiments, comprising 2.0% to 6.0% by weight of structural units derived from 1,3-butadiene.

25. Composition according to any of the preceding embodiments, comprising 2.5% to 4.5% by weight of structural units derived from 1,3-butadiene.

26. Composition according to any of the preceding embodiments, wherein components B and C are present in a weight ratio 40:60 to 85:15.

27. Composition according to any of the preceding embodiments, wherein components B and C are present in a weight ratio 60:40 to 80:20.

28. Composition according to any of the preceding embodiments, wherein the disperse phase (i) of component B has a median diameter D50 measured by ultracentrifugation of 0.3 to 2.0 μm and wherein the disperse phase (iii) of component C has a median diameter D50 measured by ultracentrifugation of 0.3 to 2.0 μm.

29. Composition according to any of the preceding embodiments, wherein at least one of the two disperse phases (i) and (iii) has a median diameter D50 measured by ultracentrifugation of 0.7 to 1.5 μm.

30. Composition according to any of the preceding embodiments, wherein components B and C are free of alkali metal, alkaline earth metal, ammonium or phosphonium salts of saturated fatty acids having 8 to 22 carbon atoms, resin acids, alkyl- and alkylarylsulfonic acids and fatty alcohol sulfates.

31. Composition according to any of the preceding embodiments, wherein components B and C each contain less than 20 ppm of ions of alkali metals and alkaline earth metals.

32. Composition according to any of the preceding embodiments, wherein components B and C are each prepared by bulk polymerization.

33. Composition according to any of the preceding embodiments, wherein components B.2 and C.2 consist solely of structural units derived from 1,3-butadiene.

34. Composition according to any of the preceding embodiments, wherein components B and C each have a content of structural units derived from 1,3-butadiene of 8% to 12% by weight.

35. Composition according to any of the preceding embodiments, comprising, as component D, at least one additive selected from the group consisting of flame retardants, anti-drip agents, flame retardant synergists, smoke inhibitors, lubricants and demoulding agents, nucleating agents, antistats, conductivity additives, stabilizers, flow promoters, phase compatibilizers, further impact modifiers other than components B and C, further polymeric constituents other than components A, B and C, fillers and reinforcers, and dyes and pigments.

36. Composition according to any of the preceding embodiments, comprising as component D at least one additive selected from the group consisting of flame retardants, lubricants and demoulding agents, stabilizers, flowability promoters, compatibilizers, and dyes and pigments.

37. Composition according to any of the preceding embodiments, wherein the composition does not contain any further graft polymer prepared by emulsion polymerization.

38. Composition according to any of the preceding embodiments, consisting to an extent of at least 90% by weight of constituents A to D.

39. Composition according to any of the preceding embodiments, consisting of components A to D.

40. Moulding compound produced from a composition according to any of Embodiments 1 to 39.

41. Moulded article obtainable from a composition according to any of Embodiments 1 to 39 or from a moulding material according to Embodiment 40.

EXAMPLES

Component A:
Linear polycarbonate based on bisphenol A with weight-average molecular weight $M_w$ of 30 000 g/mol (determined by GPC at room temperature in methylene chloride as solvent against a BPA-PC standard).

Component B-1:
Acrylonitrile(A)-butadiene(B)-styrene(S) polymer prepared by the bulk polymerization method, containing a disperse phase composed of rubber particles that have been grafted with styrene-acrylonitrile copolymer and are based on pure polybutadiene rubber as graft base, containing inclusions of styrene-acrylonitrile copolymer and a styrene-acrylonitrile copolymer matrix not bonded to the rubber. Component B-1 has an A:B:S ratio of 23:9:68% by weight and a gel content, determined as the proportion insoluble in acetone, of 20% by weight. The tetrahydrofuran-soluble styrene-acrylonitrile copolymer in component B-1 is thus present in a proportion x(ii) of 80% by weight and has a weight-average molecular weight $M_w$ (measured by GPC in tetrahydrofuran as solvent with polystyrene as standard) of 160 kg/mol. The median particle size of the disperse phase D50, measured by ultracentrifugation, is 0.9 μm. The melt flow rate (MFR) of component B-1, measured to ISO 1133 (2012 version) at 220° C. with a ram load of 10 kg, is 6.5 g/10 min.

Component B-2:
Acrylonitrile(A)-butadiene(B)-styrene(S) polymer prepared by the bulk polymerization method, containing a disperse phase composed of rubber particles that have been grafted with styrene-acrylonitrile copolymer and are based on a styrene-butadiene block copolymer rubber having a butadiene content of 75% by weight, containing inclusions of styrene-acrylonitrile copolymer and a styrene-acrylonitrile copolymer matrix not bonded to the rubber. Component B-2 has an A:B:S ratio of 22:10:68% by weight and a gel content, determined as the proportion insoluble in acetone, of 19% by weight. The tetrahydrofuran-soluble styrene-acrylonitrile copolymer in component B-2 is thus present in a proportion x(ii) of 81% by weight and has a weight-average molecular weight $M_w$ (measured by GPC in tetrahydrofuran as solvent with polystyrene as standard) of 110 kg/mol. The melt flow rate (MFR) of component B-2, measured to ISO 1133 (2012 version) at 220° C. with a ram load of 10 kg, is 30 g/10 min.

Component C-1:
Acrylonitrile(A)-butadiene(B)-styrene(S)-n-butyl acrylate(BA) polymer prepared by the bulk polymerization method, containing a disperse phase composed of rubber particles that have been grafted with styrene-acrylonitrile-n-butyl acrylate copolymer and are based on pure polybutadiene rubber as graft base, containing inclusions of styrene-acrylonitrile-n-butyl acrylate copolymer and a styrene-acrylonitrile-n-butyl acrylate copolymer matrix not bonded to the rubber. Component C-1 has an A:B:S:BA ratio of 22.5:10:63:4.5% by weight and a gel content, determined as the proportion insoluble in acetone, of 19% by weight. The tetrahydrofuran-soluble styrene-acrylonitrile-n-butyl acrylate copolymer in component C-1 is thus present in a proportion x(iv) of 81% by weight and has a weight-average molecular weight $M_w$ (measured by GPC in tetrahydrofuran as solvent with polystyrene as standard) of 115 kg/mol. The median particle size of the disperse phase D50, measured by ultracentrifugation, is 0.5 µm. The melt flow rate (MFR) of component C-1, measured to ISO 1133 (2012 version) at 220° C. with a ram load of 10 kg, is 28 g/10 min.

Component D-1:

pentaerythritol tetrastearate

Component D-2:

Irganox™ B900 (BASF, Ludwigshafen, Germany)

Mixture of 80% by weight of tris(2,4-di-tert-butyl-phenyl) phosphite (Irgafos™ 168) and 20% by weight of 2,6-di-tert-butyl-4-(octadecanoxycarbonylethyl)phenol (Irganox™ 1076)

Production and Testing of the Moulding Compounds According to the Invention

The components were mixed in a Coperion, Werner & Pfleiderer ZSK25 twin-screw extruder (Stuttgart, Germany) at a melt temperature of 260° C. and with application of a reduced pressure of 100 mbar (absolute). The moulded articles were produced at 260° C. or 300° C. and at a mould temperature of 80° C. in an Arburg 270 E injection moulding machine.

IZOD notched impact strength was determined at −30° C. according to ISO 180-1A (1982 version) on each of ten test specimens measuring 80 mm×10 mm×4 mm and reported as the average from ten individual measurements.

Elongation at break was determined at room temperature to ISO 527 (1996 version).

A measure used for thermal processing stability was the retention of low-temperature ductility measured on test specimens of dimensions 60 mm×60 mm×2 mm, which were produced at an elevated melt temperature of 300° C. by injection moulding with the aim of simulating particularly critical thermal processing conditions. Low-temperature ductility was ascertained at −30° C. on 10 test specimens thus produced by the puncture test to ISO 6603-2 (April 2002 version) with lubrication of the test specimens. The assessment criterion used here for low-temperature ductility was the proportion of individual tests resulting in a fracture profile without cracking or with stable cracking, i.e. with an assessment of the fracture profile of "YD" (yielding followed by deep drawing, FIG. 1 in ISO 6603-2) or "YS" (yielding followed by at least partially stable cracking, FIG. 2 in ISO 6603-2) according to the details in § 3.10 in ISO 6603-2 (April 2002 version).

Melt viscosity as a measure of melt flowability was determined to ISO 11443 (2014 version) at a temperature of 260° C. and a shear rate of 1000 $s^{-1}$.

A measure used for chemical resistance was stress cracking resistance (ESC) in rapeseed oil. The time until stress cracking-induced fracture failure at room temperature of a test specimen of dimensions of 80 mm×40 mm×4 mm that had been injection-moulded at a melt temperature of 260° C. was determined by subjecting the test specimen to 2.4% outer fibre strain by means of a clamping template and completely immersing it into the rapeseed oil. Measurement was performed according to DIN EN ISO 22088 (2006 version). The measurement was stopped after 7 days (168 h) if no fracture failure resulted within this period (measurement reported in this case as >168 h).

Surface gloss was measured in reflection at a viewing angle of 60° with a Haze-Gloss instrument from BYK-Gardner GmbH (Geretsried, Germany) to DIN 67530 (1982 version) on test specimens of dimensions 60 mm×60 mm×2 mm that were injection-moulded at a melt temperature of 300° C. An injection mould that had been polished to a high shine was used for production of these test specimens.

Tables 1 and 2 summarize inventive compositions and comparative compositions and the properties of the moulded articles produced therefrom. Table 1 lists those compositions that, owing to a PC:ABS ratio of 70:30 parts by weight, have a Vicat B/120 heat distortion resistance determined to ISO 306 (2013 version) on test specimens of dimensions 80 mm×10 mm×4 mm with a ram load of 50 N and with a heating rate of 120° C./h in the region of 129° C. +/−2° C. Table 1 summarizes those compositions having a PC:ABS ratio of 60:40 parts by weight and a Vicat B/120 in the region of 120° C. +/−5° C. Owing to the different heat distortion resistances, the compositions in Tables 1 and 2 are suitable for different applications and hence cover different material classes specified by the automotive industry.

TABLE 1

| Feedstock | V1 pts. by wt. | 2 pts. by wt. | 3 pts. by wt. | 4 pts. by wt. |
| --- | --- | --- | --- | --- |
| A | 70 | 70 | 70 | 70 |
| B-1 | 30 | 22.5 | 15 | 7.5 |
| C-1 |  | 7.5 | 15 | 22.5 |
| D-1 | 0.75 | 0.75 | 0.75 | 0.75 |
| D-2 | 0.10 | 0.10 | 0.10 | 0.10 |
| Average molecular weight gMw [kg/mol] | 160 | 149 | 137 | 126 |
| Test |  |  |  |  |
| Notched impact strength (−30° C.) [kJ/m²] | 47 | 49 | 43 | 29 |
| Elongation at break [%] |  | 121 |  |  |
| Puncture test (300° C./−30° C.) Proportion of tests resulting in fracture profile with stable cracking [%] | 0 | 50 | 60 | 40 |
| Melt viscosity [kJ/m²] | 238 | 228 | 219 | 211 |
| ESC (time until fracture in rapeseed oil) [h] | 29 | 32 | 27 | 24 |
| Gloss (300° C./60°) | 89 | 92 | 93 | 92 |

TABLE 2

| Feedstock | V5 pts. by wt. | 6 pts. by wt. | 7 pts. by wt. | 8 pts. by wt. | V9 pts. by wt. | V10 pts. by wt. | V11 pts. by wt. |
| --- | --- | --- | --- | --- | --- | --- | --- |
| A | 60 | 60 | 60 | 60 | 60 | 60 | 60 |
| B-1 | 40 | 30 | 20 | 10 |  | 30 | 20 |
| B-2 |  |  |  |  |  | 10 | 20 |
| C-1 |  | 10 | 20 | 30 | 40 |  |  |
| D-1 | 0.75 | 0.75 | 0.75 | 0.75 | 0.75 | 0.75 | 0.75 |
| D-2 | 0.10 | 0.10 | 0.10 | 0.10 | 0.10 | 0.10 | 0.10 |
| Average molecular weight gMw [kg/mol] | 160 | 149 | 137 | 126 | 115 | 147 | 135 |

TABLE 2-continued

| Feedstock | V5 pts. by wt. | 6 pts. by wt. | 7 pts. by wt. | 8 pts. by wt. | V9 pts. by wt. | V10 pts. by wt. | V11 pts. by wt. |
|---|---|---|---|---|---|---|---|
| Test | | | | | | | |
| Notched impact strength (−30° C.) [kJ/m$^2$] | 59 | 57 | 48 | 35 | 17 | | |
| Elongation at break [%] | | 129 | | | | 99 | |
| Puncture test (300° C./−30° C.) Proportion of tests resulting in fracture profile with stable cracking [%] | 100 | 100 | 90 | 10 | 0 | 90 | 100 |
| Melt viscosity [kJ/m$^2$] | 209 | 196 | 185 | 168 | 153 | 202 | 199 |
| ESC (time until fracture in rapeseed oil) [h] | >168 | >168 | >168 | >168 | >168 | >168 | >168 |
| Gloss (300° C./60°) | 88 | 90 | 92 | 91 | 89 | 87 | 86 |

The data in Tables 1 and 2 show that inventive compositions 2 to 4 compared to comparative composition V1 and inventive compositions 6 to 8 compared to comparative compositions V5 and V9 to V11 surprisingly have elevated gloss and hence achieve the object of the invention.

Moreover, the data show that inventive composition 6 has improved elongation at break compared to comparative composition V10, and inventive compositions 6 and 7 have improved flowability compared to the comparable comparative compositions V10 and V11. These improvements are not associated with a deterioration in processing stability, low-temperature ductility and chemical stability, and so the inventive compositions, compared to the comparative compositions, have not only improved gloss but additionally also an improved balance of melt flowability, chemical stability/stress-cracking resistance low-temperature ductility, elongation at break and processing stability.

Although inventive compositions 2 to 4 and 6 to 8 all show an improvement in gloss and hence fulfil the main object of the invention, there is found to be a preference for compositions 2 and 3 over 4 and additionally for composition 2 over 3, and also for compositions 6 and 7 over 8, and additionally for composition 6 over 7 with regard to their balance of low-temperature ductility and chemical stability/stress-cracking resistance.

The invention claimed is:

1. A thermoplastic moulding composition comprising:
A) at least one polymer selected from the group consisting of polycarbonate and polyestercarbonate,
B) rubber-modified vinyl copolymer formed from
  B.1) 80% to 95% by weight, based on the rubber-modified vinyl copolymer B, of structural units derived from
    B.1.1) 60% to 90% by weight, based on component B.1, of styrene
    B.1.2) 10% to 40% by weight, based on component B.1, of acrylonitrile
  B.2) 5% to 20% by weight, based on the rubber-modified vinyl copolymer B, of one or more elastomeric graft bases having glass transition temperatures <−50° C., containing at least 50% by weight, based on B.2, of structural units derived from 1,3-butadiene,
  wherein the rubber-modified vinyl copolymer B comprises
  (i) a disperse phase consisting of
    (i.1) rubber particles grafted with vinyl copolymer composed of structural units B.1 and
    (i.2) vinyl copolymer incorporated in the rubber particles as a separate disperse phase, likewise composed of structural units B.1, and
  and
  (ii) a rubber-free vinyl copolymer matrix not bound to the rubber particles and not incorporated into these rubber particles, consisting of structural units B.1,
C) rubber-modified vinyl copolymer formed from
  C.1) 80% to 95% by weight, based on the rubber-modified vinyl copolymer C, of structural units derived from
    C.1.1) 60% to 85% by weight, based on component C.1, of styrene
    C.1.2) 10% to 35% by weight, based on component C.1, of acrylonitrile
    C.1.3) 0.5% to 15% by weight, based on component C.1, of at least one alkyl (meth)acrylate,
  C.2) 5% to 20% by weight, based on the rubber-modified vinyl copolymer C, of one or more elastomeric graft bases having glass transition temperatures <−50° C., containing at least 50% by weight, based on C.2, of structural units derived from 1,3-butadiene,
  wherein the rubber-modified vinyl copolymer C comprises
  (iii) a disperse phase consisting of
    (iii.1) rubber particles grafted with vinyl copolymer composed of structural units C.1 and
    (iii.2) vinyl copolymer incorporated in the rubber particles as a separate disperse phase, likewise composed of structural units C.1, and
  (iv) a rubber-free vinyl copolymer matrix not bound to the rubber particles and not incorporated into these rubber particles, consisting of structural units C.1,
wherein the weight ratio of components B and C is in the range from 20:80 to 90:10, and wherein components B and C are each produced by bulk polymerization.

2. The composition of claim 1, wherein component B contains the rubber-free vinyl copolymer matrix (ii) not bound to the rubber particles and not incorporated into these rubber particles, consisting of structural units B.1, in a proportion x(ii) of 60% to 95% by weight, based on B, and component C contains the rubber-free vinyl copolymer matrix (iv) not bound to the rubber particles and not incorporated into these rubber particles, consisting of structural units C.1, in a proportion x(iv) of 60% to 95% by weight, based on C.

3. The composition of claim 2, having an average molecular weight gMw according to the formula:

$$gMw=[x(ii) \cdot Mw(ii) \cdot x(B)+x(iv) \cdot Mw(iv) \cdot x(C)]/[x(ii) \cdot x(B)+x(iv) \cdot x(C)],$$

wherein gMw is in the range from 125 to 160 kDa, where Mw(ii) is the average molecular weight Mw, measured by means of gel permeation chromatography in tetrahydrofuran against polystyrene as standard, of the vinyl copolymer matrix (ii) in component B, x(B) is the proportion of component B in % by weight in the composition, Mw(iv) is the average molecular weight Mw, measured by means of gel permeation chromatography in tetrahydrofuran against polystyrene as standard, of the vinyl copolymer matrix (iv) in component C and x(C) is the proportion of component C in % by weight in the composition.

4. The composition of claim 1, wherein the vinyl copolymer matrix (ii) has an average molecular weight Mw measured by means of gel permeation chromatography in tetrahydrofuran against polystyrene as standard of 140 to 200 kg/mol and wherein the vinyl copolymer matrix (iv) has an average molecular weight Mw measured by means of gel permeation chromatography in tetrahydrofuran against polystyrene as standard of 110 to 130 kg/mol.

5. The composition of claim 1, wherein component C.1.3 is n-butyl acrylate.

6. The composition of claim 1 comprising
30-90% by weight of component A,
5-50% by weight of component B,
3-40% by weight of component C,
and further comprising 0-20% by weight of polymer additives as component D.

7. The composition of claim 1, comprising 1.5% to 7.5% by weight of structural units derived from 1,3-butadiene.

8. The composition of claim 1, wherein components B and C are present in a weight ratio 60:40 to 80:20.

9. The composition of claim 1, wherein the disperse phase (i) of component B has a median diameter D50 measured by ultracentrifugation of 0.3 to 2.0 μm and wherein the disperse phase (iii) of component C has a median diameter D50 measured by ultracentrifugation of 0.3 to 2.0 μm and wherein at least one of the two disperse phases (i) and (iii) has a median diameter D50 measured by ultracentrifugation of 0.7 to 1.5 μm.

10. The composition of claim 1, wherein components B and C are free of alkali metal, alkaline earth metal, ammonium or phosphonium salts of saturated fatty acids having 8 to 22 carbon atoms, resin acids, alkyl- and alkylarylsulfonic acids and fatty alcohol sulfates, and wherein components B and C each contain less than 20 ppm of ions of alkali metals and alkaline earth metals.

11. The composition of claim 1, wherein components B.2 and C.2 consist solely of structural units derived from 1,3-butadiene, and wherein components B and C each have a content of structural units derived from 1,3-butadiene of 8% to 12% by weight.

12. The composition of claim 1, further comprising, as component D, at least one additive selected from the group consisting of flame retardants, lubricants and demoulding agents, stabilizers, flowability promoters, compatibilizers, and dyes and pigments, and wherein the composition does not contain any further graft polymer prepared by emulsion polymerization.

13. A moulded article comprising the composition of claim 1.

* * * * *